(12) United States Patent
Porro et al.

(10) Patent No.: US 12,338,076 B2
(45) Date of Patent: Jun. 24, 2025

(54) TWO-MASS VIBRATING CONVEYOR DEVICE AND VIBRATION DAMPER KIT FOR A TWO-MASS VIBRATING CONVEYOR DEVICE

(71) Applicant: BROVIND VIBRATORI S.P.A., Cortemilia (IT)

(72) Inventors: Roberto Porro, Cortemilia (IT); Simone Tagliero Cinquanta, Cortemilia (IT)

(73) Assignee: BROVIND VIBRATORI S.P.A., Cortemilia (IT)

( * ) Notice: Subject to any disclaimer, the term of this patent is extended or adjusted under 35 U.S.C. 154(b) by 94 days.

(21) Appl. No.: 18/563,008

(22) PCT Filed: Apr. 28, 2022

(86) PCT No.: PCT/IT2022/050115
§ 371 (c)(1),
(2) Date: Nov. 21, 2023

(87) PCT Pub. No.: WO2022/249209
PCT Pub. Date: Dec. 1, 2022

(65) Prior Publication Data
US 2024/0239609 A1 Jul. 18, 2024

(30) Foreign Application Priority Data
May 24, 2021 (IT) .......................... 102021000013355

(51) Int. Cl.
*B65G 27/26* (2006.01)
*B65G 27/08* (2006.01)
*B65G 27/30* (2006.01)

(52) U.S. Cl.
CPC ............. *B65G 27/30* (2013.01); *B65G 27/08* (2013.01)

(58) Field of Classification Search
CPC ......... B65G 17/08; B65G 27/26; B65G 27/30
(Continued)

(56) References Cited

U.S. PATENT DOCUMENTS 2,830,696 A 4/1958 Musschoot
4,813,532 A * 3/1989 Harper ................... B65G 27/32
198/767

(Continued)

FOREIGN PATENT DOCUMENTS

EP 2208693 A2 * 7/2010 ............. B65G 27/08
GB 197312 A 10/1923
(Continued)

OTHER PUBLICATIONS

Written Opinion of the International Searching Authority dated Jul. 26, 2022.

*Primary Examiner* — Douglas A Hess
(74) *Attorney, Agent, or Firm* — Jacob M. Ward; Ward Law Office LLC (57) ABSTRACT

A two-mass vibrating conveyor device is described, comprising a first mass which defines a vibrating conveyor path, a second mass which defines an equivalent vibrating conveyor path, motorization means operatively associated with the first mass and the second mass, elastic means which interconnect the first mass with the second mass, and damping means, each of the damping means being fixed at a stationary node of the elastic means. Furthermore, a vibration damper kit is described, belonging to damping means interconnecting a two-mass vibrating conveyor device to a fixed support structure.

9 Claims, 9 Drawing Sheets

(58) Field of Classification Search
USPC .................................... 198/766, 767, 773
See application file for complete search history.

(56) References Cited

U.S. PATENT DOCUMENTS

| | | | |
|---|---|---|---|
| 5,040,666 A | 8/1991 | Patel | |
| 5,074,404 A * | 12/1991 | Gonda | B65G 27/08 198/767 |
| 5,979,640 A * | 11/1999 | Horton | B65G 27/32 198/752.1 |
| 6,269,940 B1 * | 8/2001 | Rosenstrom | B65G 27/32 198/753 |
| 6,298,978 B1 * | 10/2001 | Rosenstrom | B65G 27/32 198/753 |
| 7,387,198 B2 * | 6/2008 | Thomson | B65G 27/20 198/760 |
| 7,392,897 B2 * | 7/2008 | Krell | B65G 27/30 198/760 |
| 7,426,991 B1 * | 9/2008 | Cedzo | B65G 27/10 198/767 |
| 7,472,898 B2 * | 1/2009 | Kraus | B65G 27/32 188/380 |
| 8,733,540 B2 * | 5/2014 | Woiler | B65G 27/28 198/759 |
| 9,132,966 B1 * | 9/2015 | Groenewald | B65G 27/30 |
| 9,463,490 B2 * | 10/2016 | Damm | B06B 1/166 |
| 10,046,916 B1 * | 8/2018 | Massman | B65G 27/08 |
| 10,974,907 B2 * | 4/2021 | Olmstead | B65G 27/12 |
| 11,046,528 B2 * | 6/2021 | Olmstead | B65G 27/34 |
| 11,358,801 B2 * | 6/2022 | Svejkovsky | B65G 27/32 |
| 11,905,120 B1 * | 2/2024 | Klukis | B65G 27/18 |

FOREIGN PATENT DOCUMENTS

| | | |
|---|---|---|
| JP | S58202209 A | 11/1983 |
| JP | 2014172699 A | 9/2014 |
| TW | 201318940 A | 5/2013 |
| WO | 2019193442 A1 | 10/2019 |

* cited by examiner

TWO-MASS VIBRATING CONVEYOR DEVICE AND VIBRATION DAMPER KIT FOR A TWO-MASS VIBRATING CONVEYOR DEVICE

CROSS-REFERENCE DATA

This application is a National Stage of International Application No. PCT/IT2022/050115, filed Apr. 28, 2022, which in turn claims the benefit of Italian Patent Application No. 102021000013355, filed May 24, 2021. The entire disclosures of the above applications are incorporated herein by reference.

The present invention refers to a vibrating conveyor device with two masses.

Furthermore, the present invention relates to a vibration damper kit for a two-mass vibrating conveyor device.

In general, the present invention relates to vibrating conveyors.

In particular, the present invention refers to applications of devices for generating or transmitting jigging movements with provision for dynamic balancing by means of a mass in opposite movement, e.g. a second conveyor.

In particular, the present invention relates to units comprising non-fluid type springs, vibration dampers, shock absorbers.

The invention concerns the fixing of a linear, resonant and unbalanced vibratory feeder directly to the support bench, exploiting the point where the bending of the springs is zero. Considering the close working analogy between linear and circular vibrating systems, the fixing method described below can be considered valid and applicable without limitations also to a circular, resonant and unbalanced vibratory feeder.

According to the model of a mass—spring—damper system with two degrees of freedom which theoretically describes the operating principle of a generic resonant industrial vibratory feeder, a set of masses and counterweights connected to each other by means of a set of elastic elements, for example, springs flat leaf springs, if excited by an external command force, resonates mechanically at a determined frequency f generating a movement useful for the advancement and selection of heterogeneous product that must be conveyed on production lines, in various sectors of application. In particular, in a linear appliance in an unbalanced configuration, the mass connected to the transport system, channel, oscillates in an alternating and opposite manner with respect to a relative counterweight, counter-mass, producing a throwing movement due to the inclination with which the elastic elements are installed in the vibrating unit between the lower base and the upper shelf, these movements having amplitudes proportional to the masses s of the channel system and of the counter-mass system, while their ratio is typically chosen equal to 1:1.

Similarly, in a circular vibrating device, the amplitude of movement is proportional to a combination of the ratio of the weights and the relative moments of inertia of the container system and the counter-mass system.

To attenuate the transmission of the vibration that the counterweight generates with respect to the surface on which the vibrating unit is fixed, a set of vibration dampers, generally of the passive type, are installed between them, made of elastomeric material vulcanized on steel, having shape, size and hardness variable depending on the load to be supported. It is good practice to size the vibration dampers in such a way that the ratio between the working frequency of the vibratory feeder and the natural frequency of the dampers themselves is higher than √2, and more precisely equal to about three times, corresponding to a vibration isolation value equal to 95% of the order generated by the exciting movement of the counterweight. Conversely, a frequency ratio lower than √2 produces an amplification of the vibration, with consequent transmission of strong mechanical disturbance to the load-bearing structure which, if prolonged over time, can cause its failure or be harmful to the health of the employees, operating nearby. In order to obtain the highest degree of isolation, corresponding to the lowest possible natural frequencies, the system mass can be increased, however limited to the balancing characteristics of the channel, but also to the overall dimensions, transport and interfacing with other machinery. An alternative is to reduce the stiffness of the vibration dampers, but this can cause instability in the vibrating feeder in action, causing dangerous displacements or yielding that are inadmissible and difficult to control in the related enslavement group. For this reason, in common practice, the adoption of anti-vibration mounts takes place in a dedicated manner, depending on the load conditions and operating frequency and, generally, is made by making compromise choices, which vary from case to case. Less frequent, but still effective, is the use of active type dampers, for example electromagnetic dampers, which, although offering the moving mass a mechanical counterthrust operated with an electric command, are considered complex, expensive and currently find little use in the vibrating power supply sector.

The elastomeric material of which passive vibration dampers are made is subjected to prolonged vibration, in the order of billions of cycles, and since it often comes into contact with water, oil and other chemical agents, it is subject to wear: the loss of its mechanical properties reduces the filtering of vibration and in many cases, its deterioration causes pollution of the production lines, with severe limitations to the use in sectors to be kept sterilized; for this, for example, the NBR rubber which over time consumes the classic coating smoky black in color and subject to premature aging, it is not really suitable for food and pharmaceutical production areas. On the other hand, polyurethane undergoes slower aging in this regard, but is not resistant to contact with water and oil, while silicone, although it is well tolerated in almost all production environments, because it is resistant to water, oil and abrasion, due to its non-stick characteristics, is very bad in adhesion and at low hardness <30Sh-A it is easily damaged. More generally, elastomeric materials exhibit different physical-chemical reactions, depending on frequency and temperature.

An alternative to the use of elastomeric anti-vibration mounts is the use of resonant vibrating bases in a balanced configuration, characterized by the opposite and iso-frequential alternating movement of a transport channel with respect to a set of counterweights, both connected to a common base which receives the energy due to the difference in oscillation of the two opposing vibrating systems. In this case, the more these vibrate with equal intensity in terms of oscillation amplitude and frequency, the lower the residual energy transferred to the common base is and, therefore, the greater the insulation of the latter with respect to the surface on which it is fixed, with minimization of the vibration transmitted to the floor and consequent annoyance.

However, a balanced vibratory feeder requires a double set of springs and masses, requiring a complex calibration of the two vibrating systems of which it is composed, sometimes made difficult by the balancing conditions of the transport channel or by the size requirements of the machine. Furthermore, a balanced vibratory feeder requires doubled electrical power compared to an equivalent unbalanced vibrating base, having to move two models consisting of mass—spring—damper at the same time.

The state of the art referred to a balanced vibratory feeder is represented by U.S. Pat. No. 5,040,666, which relates to a vibrating conveyor device with two masses for conveying material comprising a driven mass, which defines the transport path of the vibrating material, and a driving mass for imparting a vibrating transport force to the driven mass; a vibration drive is operatively associated with the driving mass to impart a vibratory force to the driven mass, the driven mass is adjacent to the driving mass and is connected to the driving mass by elastic devices, such as coil springs; the link arms also interconnect the driven mass and the driver mass, with one end of each arm rotatably connected to the driven mass and the other end rotatably connected to the driver mass, supports connected to the link arms near the nodes of the connecting arms conn or the device to a supporting structure, such as the floor or roof of a building where the transport device is installed.

Regarding the problem to be solved, the present invention relates to a new way of mounting resonant vibratory feeders to their support frame in order to:
create a repeatable method of assembling the vibrating bases and a passive vibration damping method, an alternative to the use of anti-vibration mounts;
avoid deterioration of the elastomeric anti-vibration mounts, regardless of the sector of use of the vibratory feeder;
propose a vibrating feeder solution that maintains the constructive simplicity of a device in an unbalanced configuration, but has the functional characteristics of a balanced type device.

Regarding the solution to the above problem, the invention consists in making a resonant linear vibrating base in an unbalanced configuration with characteristics similar to an equivalent balanced vibratory feeder model, in terms of minimizing the transmission of the vibration to the support surface, while maintaining the mechanical properties of the traditional vibrating base, with two degrees of freedom.

A similar reasoning can be considered applicable to a vibrating base of the circular, resonant and unbalanced type.

Regarding the flexion of elastic elements, rest position with in a linear vibratory feeder, the movement of the channel system, opposite to that of the counter-mass system, occurs due to a bending of the elastic elements connected between the two-mass systems, with respect to a rest position, in which the harmonic oscillation is equal to zero and the vibration is absent. In the specific case of flat leaf springs traditionally mounted in a resonant device, the point in which the oscillation is zero is positioned at a different height along the elastic element, depending on the ratio between the weights of the components of the duct system and the counter-mass system; for example, if this ratio is 1:1, the zero vibration position results in the spring at half free length. With a 1:2 ratio, it is approximately ¼ of a spring, favorable to the counter-mass system. With a 2:1 ratio, it is about ¼ of a spring, favorable to the duct system.

Regarding iso-frequency in the vibrating system and energy balance, considered a generic linear mechanical resonator with two degrees of freedom described theoretically by the mass-spring-damper model, the resonant frequency is expressed in Hertz, using the formula:

$$f = \frac{1}{2}\pi\sqrt{\frac{NK}{m_p}} \text{ [Hz]}$$

wherein:
N=total number of springs installed;
K=bending stiffness of the single spring;

$$m_p = \frac{m_1 m_2}{m_1 + m_2}$$

that is the parallel of the masses of the channel system ($m_1$) and of the counter-mass system ($m_2$).

The formula of the resonant frequency shows that, in a linear vibrating base with two degrees of freedom, of an unbalanced type, the elastic elements (springs) constitute the common element between the mass of the channel system ($m_1$) and that of the counter-mass system ($m_2$).

In order to ensure an iso-frequency of the two systems to match the generation of a paritetic harmonic oscillation and a consequent t energy balance between them, a ratio between the masses equal to 1:1 is chosen as the reference corresponding to the rest position of the elastic element placed exactly in the middle.

The invention provides that, if this vibration-free point is connected to the support surface, for example, to the reference bench, the vibrating device can continue to operate according to the two-degree-of-freedom model while maintaining the alternating and opposite movements of the channel and counter-mass. However, unlike what occurs in an equivalent device mounted on anti-vibration mounts, the new method of fixing the vibrating unit implies that only a residual portion of vibration is transmitted to the base, equal to the difference between the energy generated by the oscillating movement of the channel system and that generated by the oscillating movement of the counter-mass system. In other words, the more the oscillation frequency of the two movements is similar respecting an iso-frequency condition, the lower the vibration is in the point at the center of the spring taken as a reference and the lower the displacement is of the mechanical structure connected thereto, just as it occurs for a device in balanced configuration. For this reason, it can be explained that a vibratory feeder in an unbalanced configuration behaves like one in a balanced configuration, simply by choosing a fixing point different from the traditional case, without doubling the mechanical parts or the electrical power supply.

Regarding the damping of residual vibration by means of silent-blocks, in a linear vibrating unit examined, the alternating and opposite bending that the single elastic element undergoes with respect to the conveying direction induces a semi-rotation around the axis passing through its rest position. To accommodate this rotation without compromising the regular oscillating movement of the spring and the correct functioning of the vibratory feeder, the surface of the elastic element not affected by vibration, or subject to minimal vibration, or near the rest position, is enclosed between the elastomers of a damping element, for example of the silent-block type. The good elastic property in torsion of this elastomer, installed, for example, in a round shape and of chosen hardness, has the function of accompanying the alternating semi-rotation of the spring by filtering the energy generated by this movement, like an anti-vibration device.

Object of the present invention is solving the aforementioned prior art problems by providing a two-mass vibrating conveyor device and a vibration damper kit for a two-mass vibrating conveyor device which have a new fixing method for the elimination of the vibration dampers supports between the counterweight and the underlying reference plane: the vibrating device can thus be fixed directly to the support bench by means of bolts.

A further object is providing a two-mass vibrating conveyor device and a vibration damper kit for a two-mass vibrating conveyor device which allow replacing traditional anti-vibration mounts with integrated elastomeric damping elements, for example, silent-blocks, allowing compliance with the sanitary design rules imposed in the sectors of use of vibrating feeders.

A further object is providing a two-mass vibrating conveyor device and a vibration damper kit for a two-mass vibrating conveyor device which allow maintaining the simple architecture of the two-degree-of-freedom vibratory feeder, improving its efficiency in terms of reduction of passive vibration transmission to the support surface.

The above and other objects and advantages of the invention, as will emerge from the following description, are achieved with a two-mass vibrating conveyor device and a vibration damper kit of a two-mass vibrating conveyor device such as those described in the respective independent claims.

Preferred embodiments and non-trivial variations of the present invention are the subject matter of the dependent claims.

It is understood that all attached claims form an integral part of the present description.

It will be immediately obvious that innumerable variations and modifications (for example relating to shape, dimensions, arrangements and parts with equivalent functionality) can be made to what is described, without departing from the scope of the invention as appears from the attached claims.

As advantageous effects of the invention, the silent-block that centrally closes the leaf springs can exploit the radial rigidity of the elastomer of which it is composed, to keep the vibratory feeder raised from the reference plane and aligned longitudinally, according to the construction requirements of the enslavement group in which it is inserted.

Interventions of vulcanization of the elastomer on the walls of the steel parts of the damping component, silent-block, have the task of stiffening also in the transverse direction, with respect to the conveyance direction, thus reducing the instability of the transport channel in case of lateral imbalance.

The application of silent-blocks to one or more packs of springs of the resonant device allows fixing the vibrating unit directly to a support surface, by means of screws and without the installation of anti-vibration mounts traditionally placed between the counterweight and the support, while the device continues to resonate regularly, as if it were suspended.

This implies the possibility of lightening the support frame. Minimizing the vibration of the base requires less impressive support t benches, with fewer ribs, therefore, easier to build and, in general, lighter. This represents a simplification in the transport of lines to user customers, often subject to shocks or damage suffered during the transfer.

Furthermore, the fixing of the vibrating unit directly to the bench gives greater stability to the sliding surface also in the longitudinal direction of conveyance of the product, limiting the problems of alignment between consecutive transport channels, or of synchronization between the vibratory feeder and the machinery placed downstream. These problems are generally caused by the failure of the passive vibration dampers under the weight of the overall vibrating system.

Under these operating conditions, both balancing rules already known for a common linear vibratory feeder with two degrees of freedom remain valid, i.e.:
  the transport channel is balanced with respect to the vibrating feed unit if the straight line passing through the center of gravity of the channel system and the counter-mass system is perpendicular to the plane of inclination of the springs, with respect to the direction and direction of conveyance, typically, $\alpha=18°$;
  the transport channel, similar to the model of a beam resting at the ends, requires to be mechanically stiffened in such a way that the harmonic ratio between the frequency of the first bending mode and the working frequency of the vibratory feeder is higher than $\sqrt{2}$, and properly, at least equal to 3.

From the experimental point of view, this translates into a better quality of vibration that allows the product to advance while minimizing the slowdown defect in the central area of the transport channel, as commonly found in linear resonant vibrating feeds.

The suspension of the vibrating device by means of damping elements, silent-blocks, allows considerably reducing the noise of the vibratory feeder, due to the fixing of the vibrating unit in the point where the leaf springs have zero vibration, with the result of a reduction in the propagation of the resonant effect induced between the moving masses, such as the sheets of the transport channel, the carters, and the various mechanical parts making up the support surface, for example, the banquet tubes, and the interlocking unit.

The reduction of noise, especially advantageous in the installation of vibrating units in battery, represents an improvement in the quality of the working and production environments, aimed at complying with the regulations in force on the soundproofing of working environments.

From the health point of view for the protection of the health of workers operating in the assembly, testing, use and maintenance of production lines that adopt vibrating transport units, the effect of minimizing the vibration given to the support benches also arises as an important milestone for the protection of the health of workers operating in such a technological sector, limiting the risks of damage that vibration over time causes to limbs and joints.

The present invention will be better described by some preferred embodiments, provided by way of non-limiting example, with reference to the attached drawings, in which.

Figure 1:
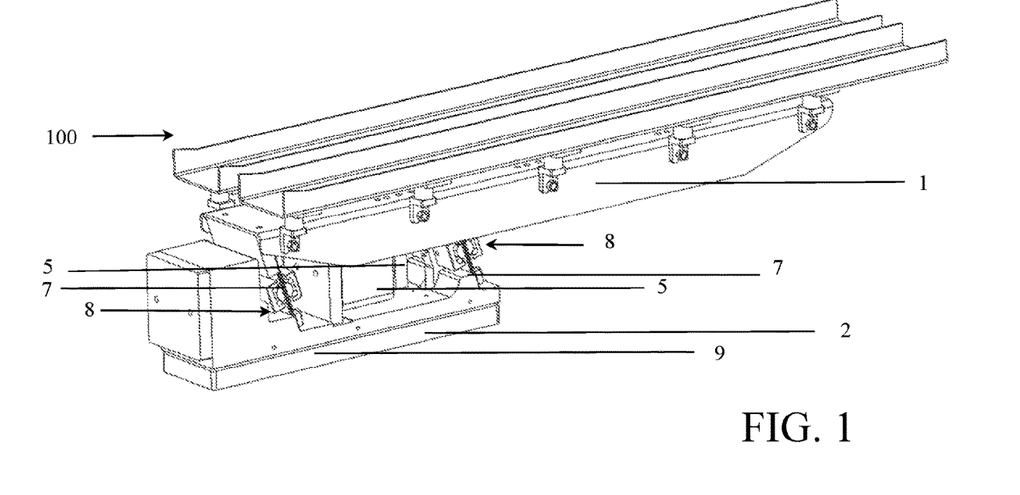
FIG. 1 shows an axonometric view of a first embodiment of the vibrating conveyor device with two masses, according to the present invention.
Figure 2:
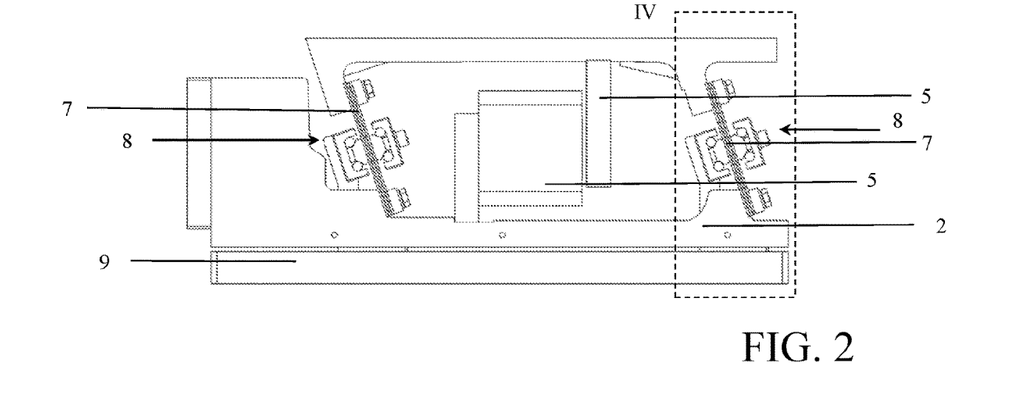
FIG. 2 shows a side view of a subassembly of the previous figure.
Figure 3:
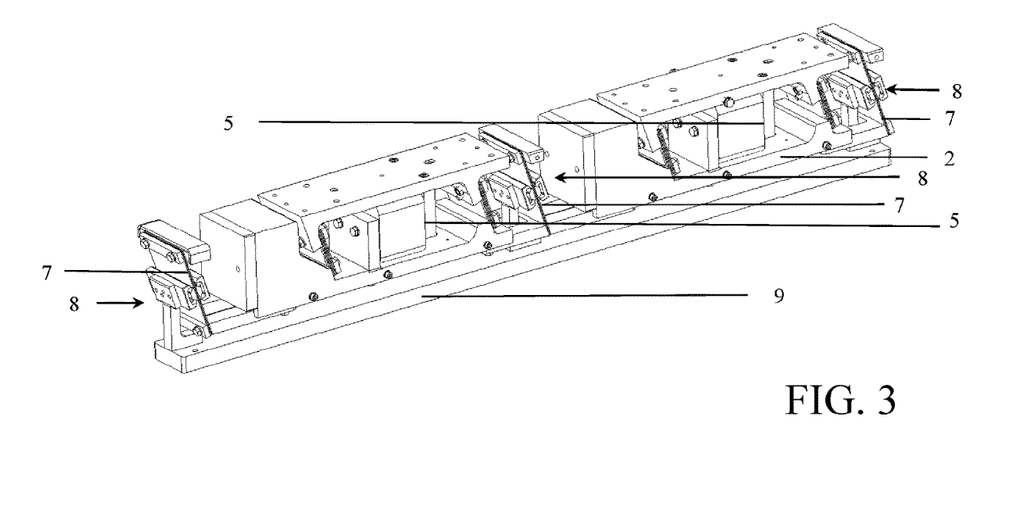
FIG. 3 shows a side view of a subassembly of a second embodiment of the two-mass vibrating conveyor device, according to the present invention.
Figure 4:
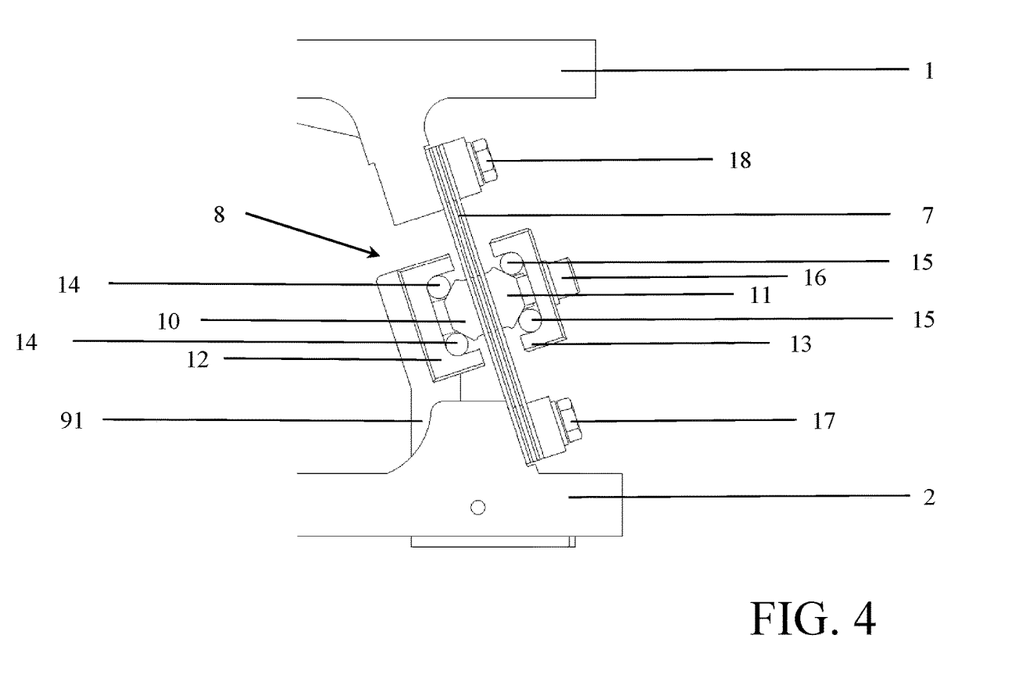
FIG. 4 and FIG. 5 show an enlarged detail IV of FIG. 2 in two different forms.
Figure 5:
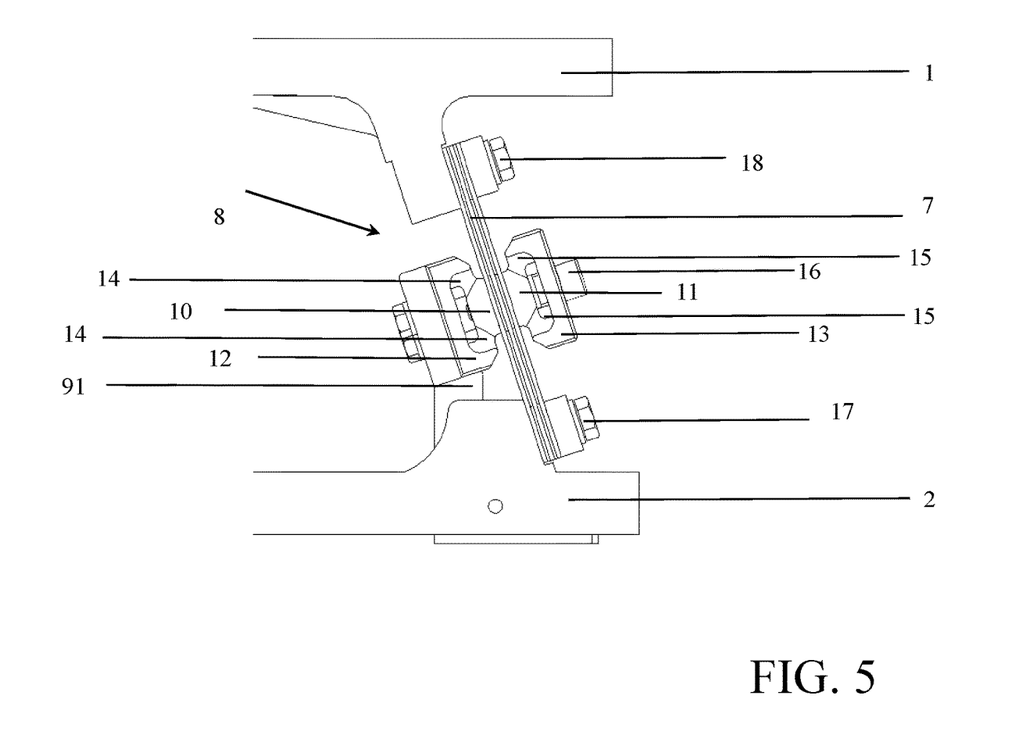
Figure 6:
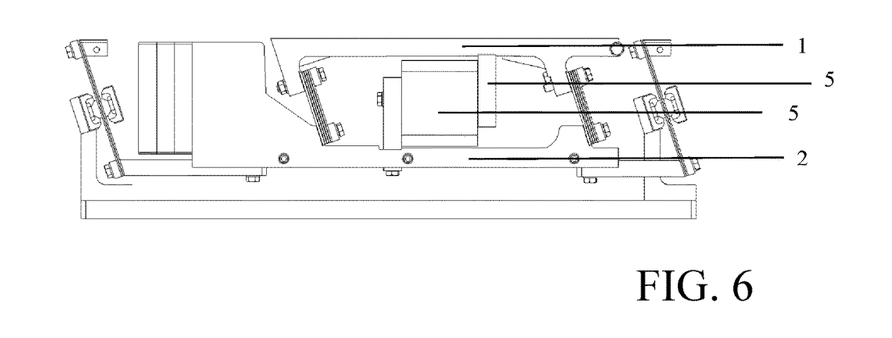
FIG. 6 shows a side view of a sub-assembly of a third embodiment of the two-mass vibrating conveyor device, according to the present invention.
Figure 15:
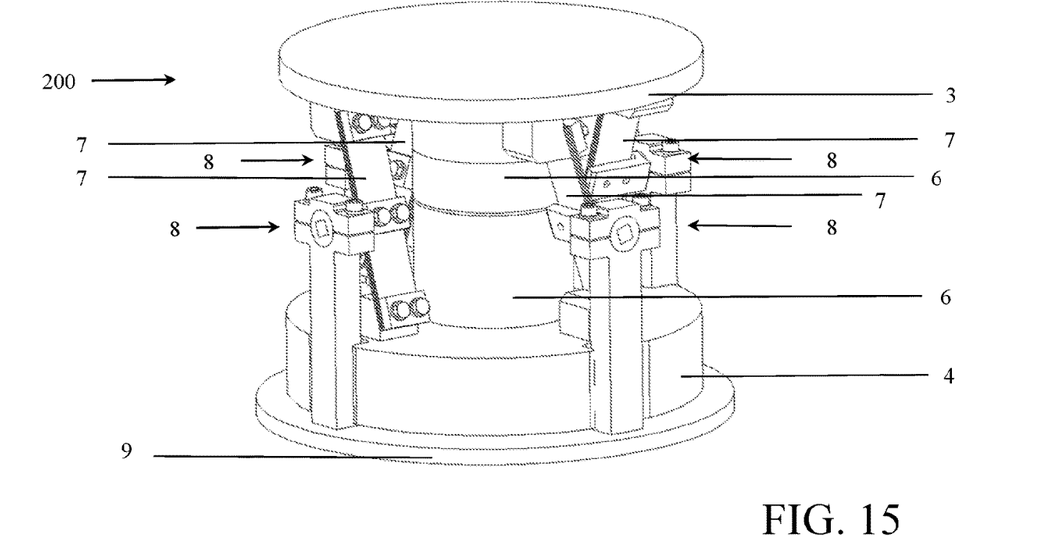
FIG. 15 shows an axonometric view of a sixth embodiment of the vibrating conveyor device with two masses, according to the present invention.

Referring to FIG. 1 and FIG. 15, it is possible to note that a two-mass vibrating conveyor device 100, 200 comprises a first mass 1, 3 which defines a vibrating conveyor path, a second mass 2, 4 which defines an equivalent path of vibrating conveyor, motorization means 5, 6 operatively associated with the first mass 1, 3 and the second mass 2, 4 to impart a vibrating force to the first mass 1, 3 and a vibrating force in counter-phase to the second mass 2, 4, elastic means 7 which interconnect the first mass 1, 3 and the second mass 2, 4 and damping means 8 which interconnect the two-mass vibrating conveyor device 100, 200 to a fixed support structure 9.

Advantageously, each of the damping means 8 is fixed at a stationary node of the elastic means 7 to help transmit a reduced dynamic reaction to the fixed support structure 9.

Referring to FIGS. 2 to 5, 7, 8, and 15 to 17, it is possible to note that each of the damping means 8 consists of a rigid clamp formed by a pair of clamp plates 10, 11, each clamp plate 10, 11 being shaped to be fixed at a respective stationary node of the elastic means 7, at least one interface plate 12, 13 being connected to the respective clamp plate 10, 11 by means of a component of a damping substance 14, 15 and first connecting means 16 of the pair of clamp plates 10, 11 and interface plates 12, 13 with the component of a damping substance 14, 15.

The elastic means 7 comprise at least one pack of foils, each foil being elastically deformable and shaped to receive the first connecting means 16, the second connecting means 17 to the second mass 2, 4 and the third connecting means 18 to the first mass 1, 3, the first connecting means 16 being located between the second connecting means 17 and the third connecting means 18.

Alternatively or in a combined way, the elastic means 7 comprise at least one elastically deformable sheet shaped to receive the first connecting means 16, the second connecting means 17 to the second mass 2, 4 and the third connecting means 18 to the first mass 1, 3, the first connecting means 16 being located between the second connecting means 17 and the third connecting means 18.

Referring to FIG. 1, 2, 3, 6, 10, 15, 17, it is possible to note that the motorization means 5, 6 consist of at least one electromagnet with a ferromagnetic core and a coil body fixed to a mass, an electromagnet armature being fixed to the other mass, so as to be able to move the first mass 1, 3 in counter-phase with respect to the second mass 2, 4.

Alternatively, the motorization means 5, 6 consist of an electric motor connected to a cam crank mechanism fixed to one of said first mass 1, 3 and said second mass 2, 4, not shown.

Referring to FIGS. 1 to 14, it is possible to note that the vibrating conveyor path of the first mass 1 consists of a linear section.

Figure 17:
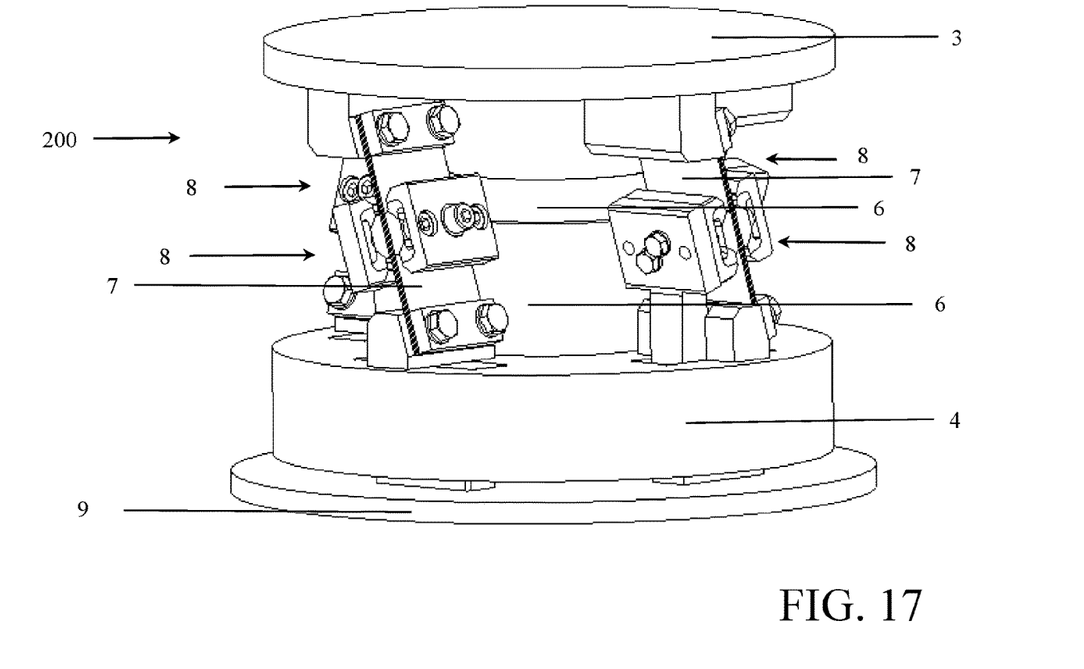
FIG. 17, shows an axonometric view of a seventh embodiment of the vibrating conveyor device with two masses, according to the present invention.

Referring to FIG. 15, 17, it is possible to note that the vibrating conveyor path of the first mass 3 consists of a curved portion.

Figure 7:
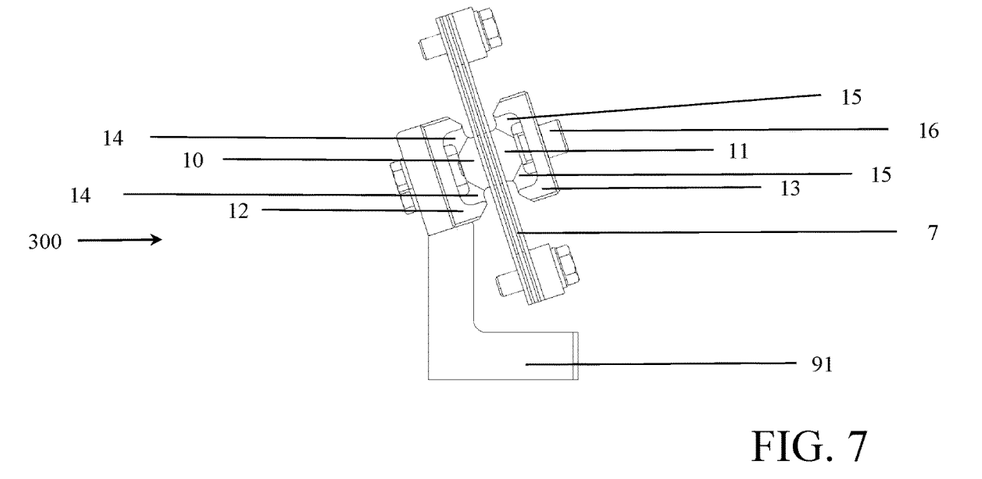
FIG. 7 shows a first embodiment of the vibration damper kit, according to the present invention.
Figure 8:
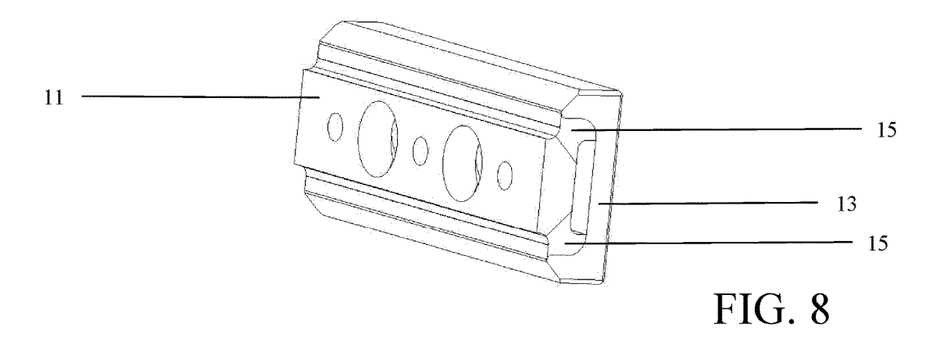
FIG. 8 shows an embodiment of a relevant detail of an embodiment of the vibration damper kit, according to the present invention.
Figure 9:
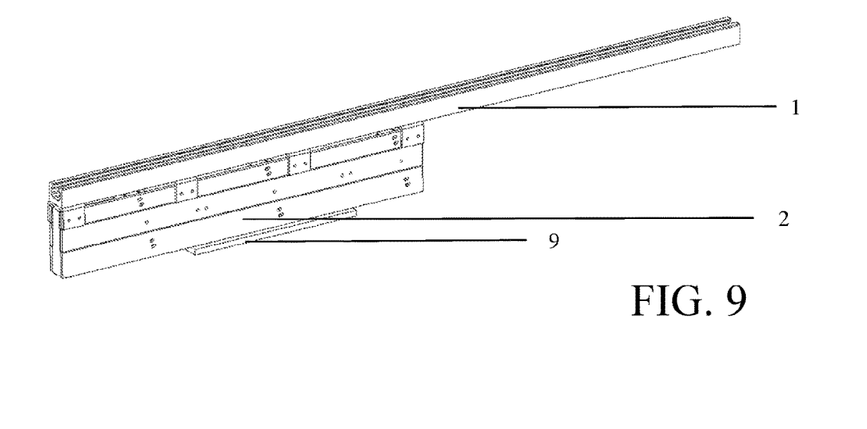
FIG. 9 shows an axonometric view of a fourth embodiment of the vibrating conveyor device with two masses, according to the present invention.
Figure 10:
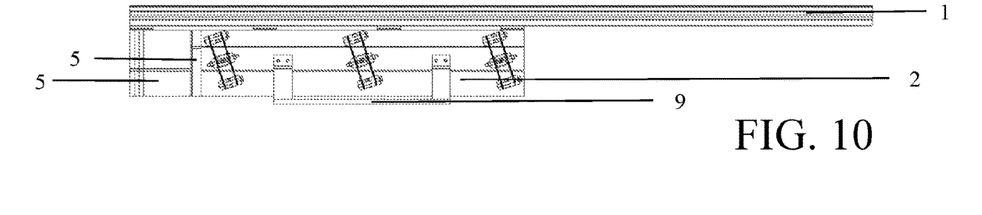
FIG. 10 shows a side view of the previous figure.
Figure 11:
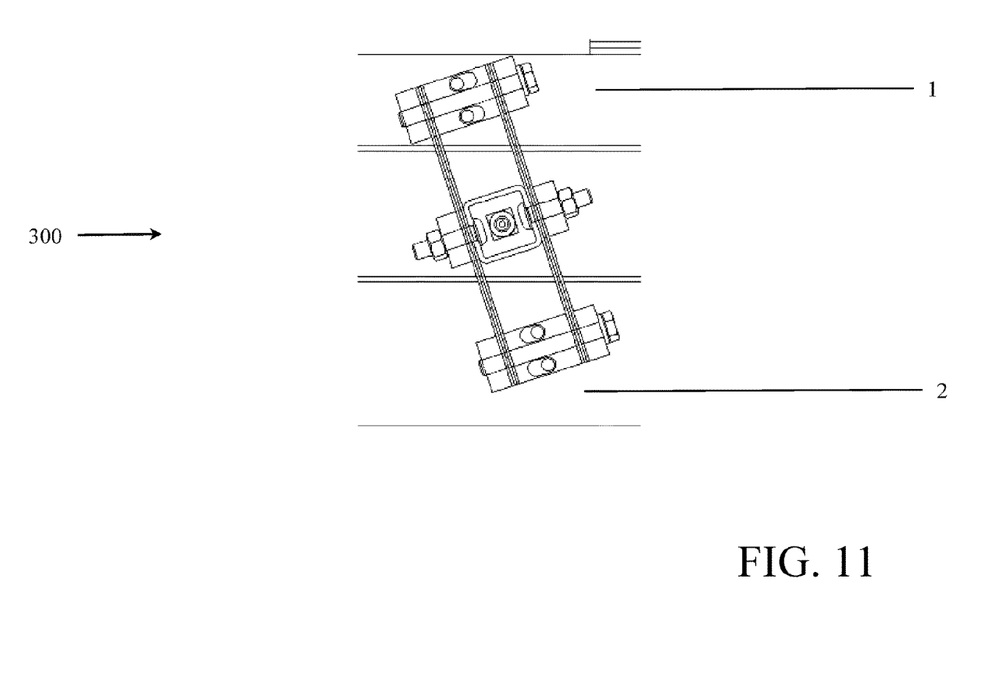
FIG. 11 shows a second embodiment of the vibration damper kit, according to the present invention.
Figure 12:
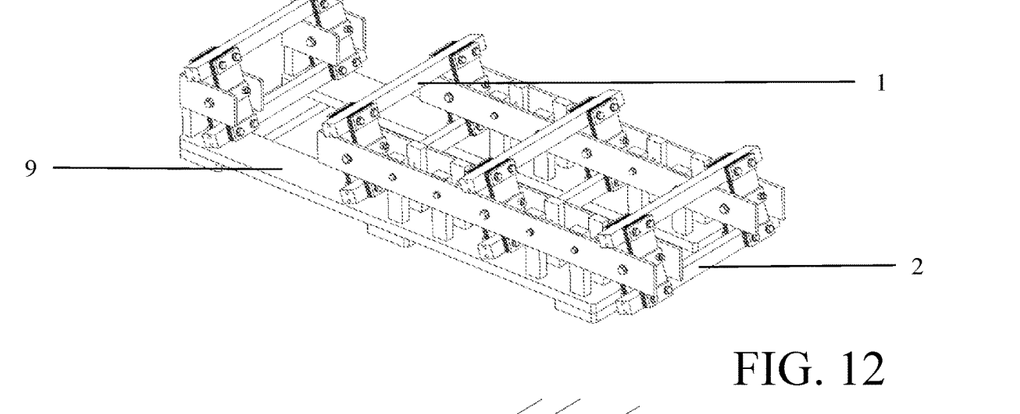
FIGS. 12, 13, 14 show an axonometric view of a fifth embodiment of the two-mass vibrating conveyor device, according to the present invention.
Figure 13:
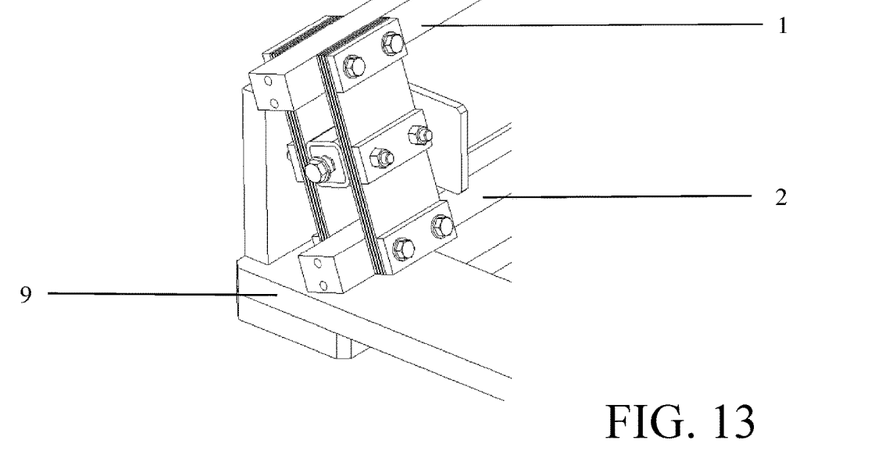
Figure 14:
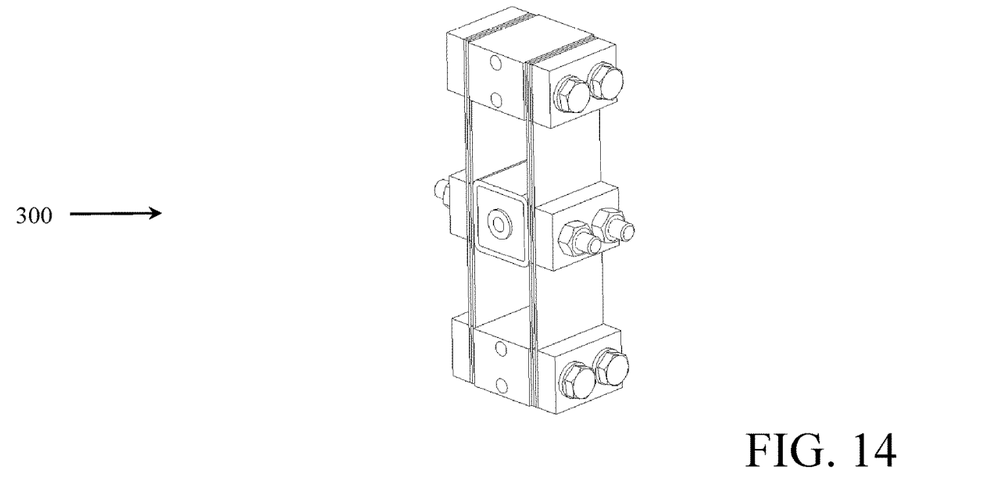
Figure 16:
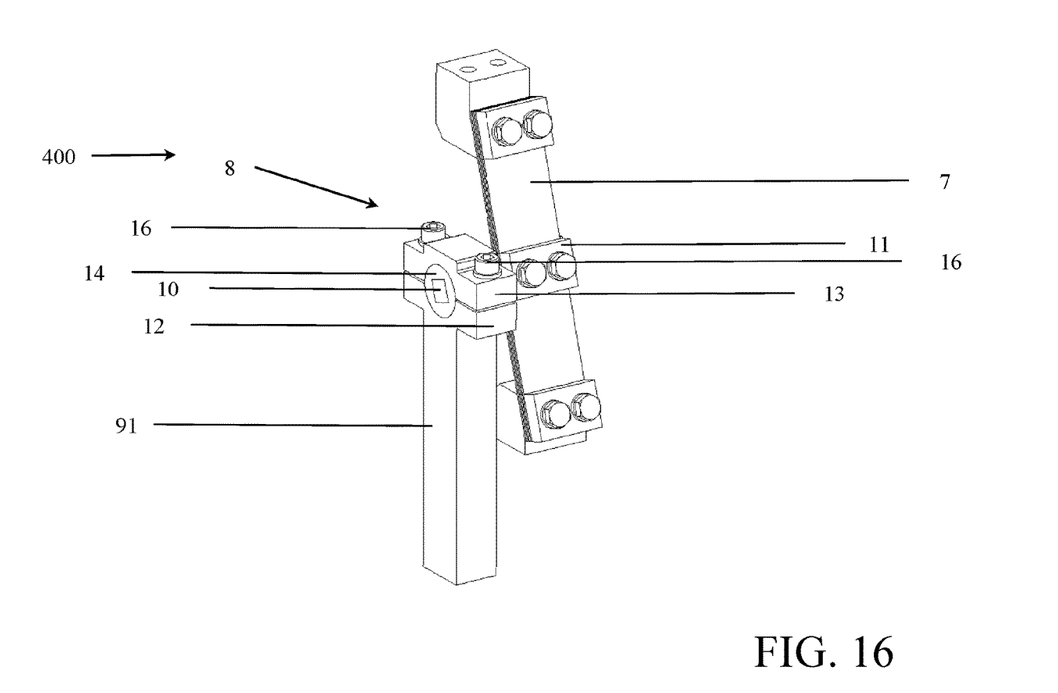
FIG. 16 shows a third embodiment of the vibration damper kit, according to the present invention.
Figure 18:
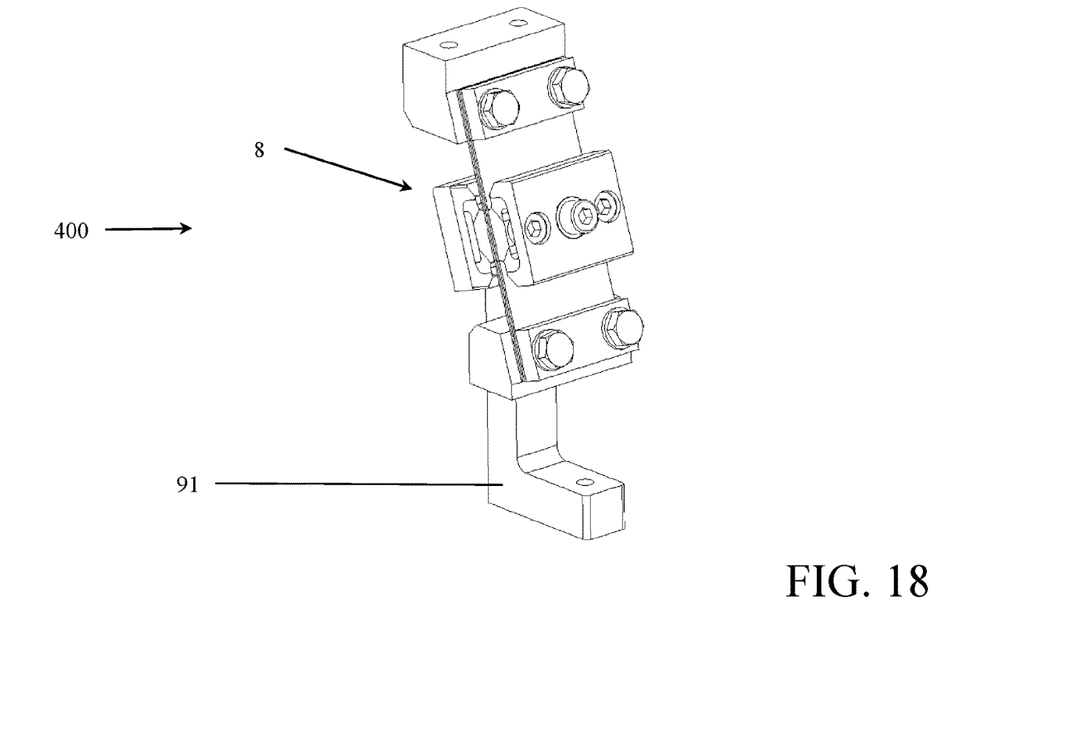
FIG. 18 shows a fourth embodiment of the vibration damper kit, according to the present invention.
Figure 19:
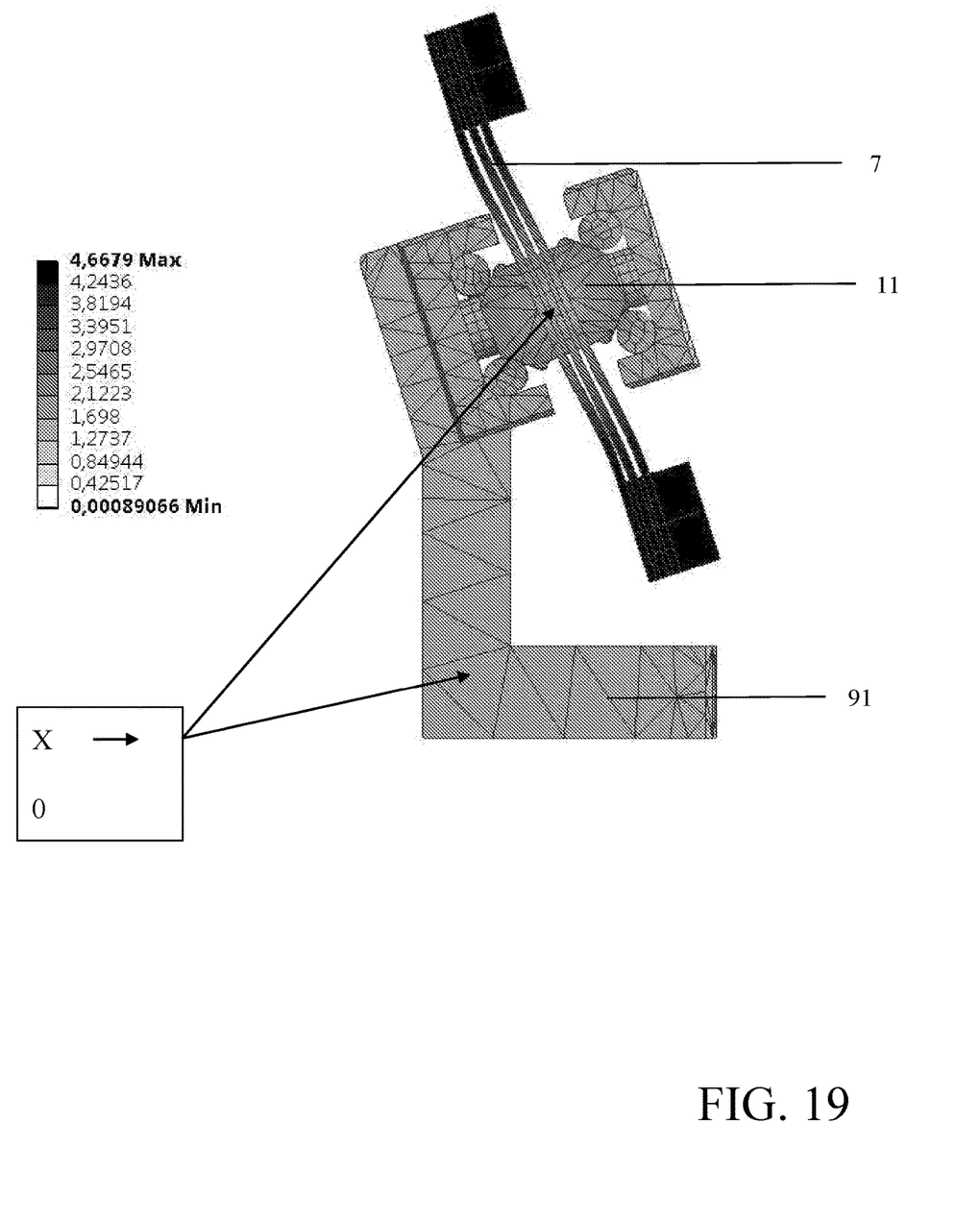
FIG. 19 shows an FEA rendering image concerning the behavior of the total deformation in millimeters of the vibration damper, according to the present invention.
Figure 20:
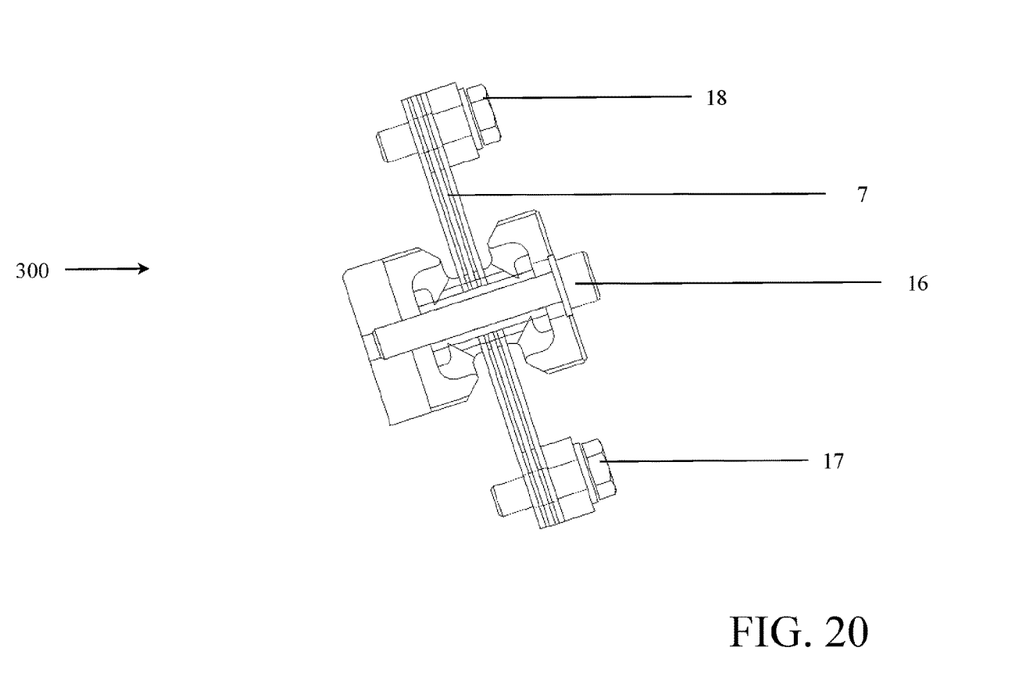
FIGS. 20, 21 show a sectional view of the vibration damper kit of FIG. 7, according to the present invention.
Figure 21:
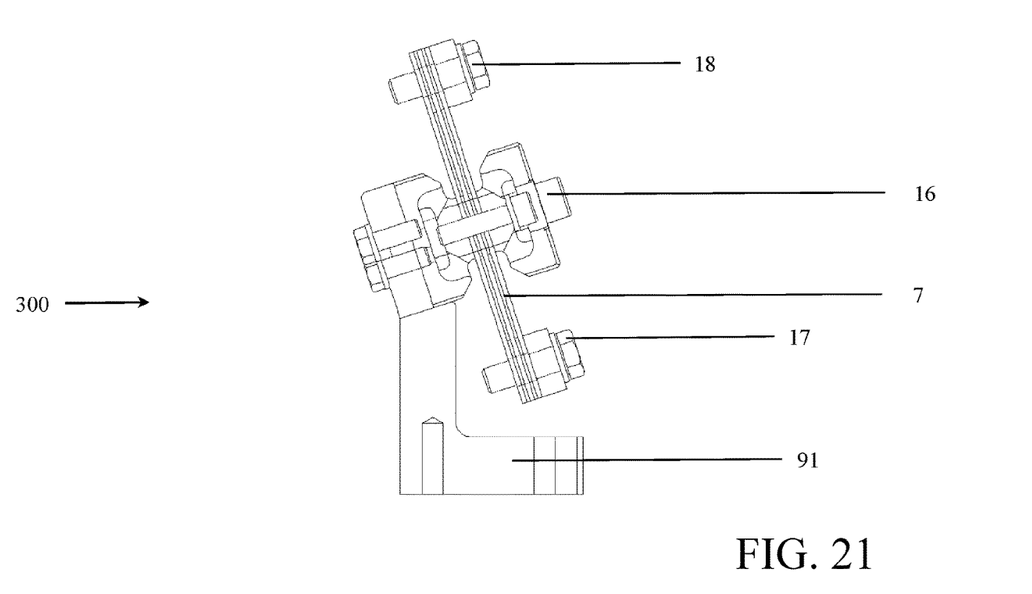

Referring to FIG. 7, 11, 14, 20, 21 and to FIG. 16, 18, it is possible that a vibration damper kit 300, 400 according to the present invention belongs to damping means 8 which interconnect a two-mass vibrating conveyor device 100, 200 to a fixed support structure 9, the two-mass vibrating conveyor device 100, 200 comprising a first mass 1, 3 which defines a vibrating conveyor path, a second mass 2, 4 which defines an equivalent vibrating conveyor path, motorization means 5, 6 operatively associated with the first mass 1, 3 and to the second mass 2, 4 to impart a vibrating force to the first mass 1, 3 and a vibrating force in counter-phase to the second mass 2, 4, and elastic means 7 which interconnect the first mass 1, 3 and the second mass 2, 4.

Advantageously, the vibration damper kit 300, 400 comprises a rigid clamp formed by a pair of clamp plates 10, 11, each clamp plate 10, 11 being shaped to be fixed at a respective stationary node of the elastic means 7, at least one interface plate 12, 13 being connected to the respective clamp plate 10, 11 by means of a component of a damping substance 14, 15, and first connecting means 16 of the pair of clamp plates 10, 11 and such at least one interface 12, 13 with the component of a damping substance 14, 15.

The vibration damper kit 300, 400 includes a fixed support structure 91.

The vibration damper kit 300, 400 includes elastic means 7.

EXAMPLES

In the first phase of analysis, the research activity concerned the design of silent-block dampers with polyurethane rods with a hardness between 40 Sh-A, 80 Sh-A assembled on supports applied to a Brovind Vibratori S.p.A. AL-80 linear vibrating base, with cast iron base and packs of flat leaf springs suitably modified with respect to the standard version. Once the model was validated by means of FEM simulation, the mechanical parts were built and assembled in the laboratory.

The experimental measurements carried out on the modified Brovind Vibratori S.p.A. AL-80, equipped with a two-way channel with a length of 1100 mm, confirmed the validity of the theoretical predictions obtained from the BROVIND SIS simulator, obtaining in the laboratory an isolation of the vibration from the fixing bench between 94% and 96%, AS channel=12 g; AS banquet [vertical]=0.7 g; AS banquet [horizontal]=0.4 g.

Considering the excellent results found, a second phase of designing the silent-block damping elements was started, in which it was planned to vulcanize the elastomer (polyurethane, 40 Sh-A) directly on the support, in order to create a mechanical component dedicated and ready to use, without the need for prior assembly. Also in this case, the model was validated with the BROVIND SIS simulator, before being built.

In addition, a further version of the support with silent-block damper was modeled that can be applied externally to existing or newly designed linear vibratory feeders, without the need for intervention and modifications to the vibrating structure. Like a kit, this solution could extend the advantages described to the case of linear systems: with single vibrating units already existing and in production; with vibrating units placed in cascade for feeding on very large transport channels, for example, up to two meters in length for each device; considering the close analogy of operation between linear and circular vibrating systems, the fixing method with silent-block can be considered valid and applicable without limitations also to a circular, resonant and unbalanced vibratory feeder.

The invention claimed is:

1. A two-mass vibrating conveyor device in combination with a fixed support structure,
the two-mass vibrating conveyor device comprising a first mass which defines a vibrating conveyor path, a second mass which defines an equivalent vibrating conveyor path, a motorization means operatively associated with the first mass and the second mass to impart a vibrating force to the first mass and a vibrating force in counter-phase to the second mass, an elastic means which interconnect the first mass and the second mass and a damping means which interconnect the two-mass vibrating conveyor device to the fixed support structure, each of the damping means being fixed at a stationary node of the elastic means to help transmit a dynamic reaction equipped with a fixed support structure,
wherein each of the damping means is constituted by a rigid clamp formed by a pair of clamp plates, each clamp plate being shaped to be fixed in correspondence of a respective stationary node of the elastic means, at least one interface plate being connected to the respective clamp plate by means of a component of a damping substance and first connecting means of the pair of clamp plates and the at least one interface plate with the component of a damping substance.

2. The two-mass vibrating conveyor device of claim 1, wherein the elastic means comprise at least one pack of sheets, each sheet being elastically deformable and shaped to receive the first connecting means, second connecting means to the second mass and third connecting means to the first mass, the first connecting means being located between the second connecting means and the third connecting means.

3. The two-mass vibrating conveyor device of claim 2, wherein the elastic means comprise at least one elastically deformable sheet shaped to receive the first connecting means, the second connecting means to the second mass and the third connecting means to the first mass, the first connecting means being located between the second connecting means and the third connecting means.

4. The two-mass vibrating conveyor device of claim 1, wherein the motorization means consisting of at least one electromagnet with a ferromagnetic core and a coil body fixed to a mass, an electromagnet armature being fixed to the other mass, so as to be able to move the first mass in counter-phase with respect to the second mass.

5. The two-mass vibrating conveyor device of claim 1, wherein the motorization means consisting of an electric motor connected to a cam crank mechanism fixed to one of the first mass and the second mass.

6. The two-mass vibrating conveyor device of claim 1, wherein the vibrating conveyor path of the first mass consists of a linear section or a curved section.

7. A vibration damper kit belonging to damping means which interconnect a two-mass vibrating conveyor device to a fixed support structure,
the two-mass vibrating conveyor device comprising a first mass defining a vibrating conveyor path, a second mass defining an equivalent vibrating conveyor path, motorization means operatively associated with the first mass and the second mass to impart a vibrating force to the first mass and a vibrating force in counter-phase to the second mass, elastic means which interconnect the first mass and the second mass, the vibration damper kit comprising a rigid clamp formed by a pair of clamp plates, each clamp plate being shaped to be fixed at a respective stationary node of the elastic means, at least one interface plate being connected to the respective clamp plate by means of a component of a damping substance, and first connecting means of the pair of clamp plates and the at least one interface plate with the damping substance.

8. The vibration damper kit of claim 7, comprising a fixed support structure.

9. The vibration damper kit of claim 7, comprising elastic means.

* * * * *